United States Patent

Wolgamuth

[11] Patent Number: 5,722,349
[45] Date of Patent: Mar. 3, 1998

[54] ERGONOMIC HAND PET WASHING SYSTEM

[76] Inventor: Mark R. Wolgamuth, 16 Hawxhurst Rd., Monroe, N.Y. 10950

[21] Appl. No.: 695,202

[22] Filed: Aug. 1, 1996

[51] Int. Cl.$^6$ .................................................. A01K 13/00
[52] U.S. Cl. ........................... 119/665; 119/632; 401/7
[58] Field of Search ........................ 119/665, 664, 119/602, 626, 632; 401/7; 15/110, 227; 2/158, 159, 160; 132/149

[56] References Cited

U.S. PATENT DOCUMENTS

| | | | |
|---|---|---|---|
| 1,530,327 | 3/1925 | Redlick | 401/7 |
| 2,405,154 | 8/1946 | Logan | 401/7 |
| 3,701,604 | 10/1972 | Holroyd | 401/7 |
| 4,249,521 | 2/1981 | Gueret | 15/227 X |
| 4,766,914 | 8/1988 | Briggs | 2/159 X |
| 5,120,304 | 6/1992 | Sasaki | 2/159 X |
| 5,169,251 | 12/1992 | Davis | 401/7 |
| 5,419,014 | 5/1995 | Piantedosi | 15/227 |
| 5,441,355 | 8/1995 | Moore | 401/7 |
| 5,524,575 | 6/1996 | Lennon | 15/227 X |

*Primary Examiner*—Gene Mancene
*Assistant Examiner*—Yvonne R. Abbott

[57] ABSTRACT

A new Ergonomic Hand Pet Washing System for facilitating washing of an animal without the user being in personal contact with the harsh shampoos utilized or the animal. The inventive device includes at least one resilient rubber glove formed to fit various sizes of hands, a rubber tubing secured to the resilient rubber glove carrying soap and water for washing, a valve secured at the end of the rubber tubing opposite of the resilient rubber glove which controls the soap and water flow, and an in-line shampoo applicator for adding soap to the water which enters the rubber tubing.

5 Claims, 3 Drawing Sheets

ERGONOMIC HAND PET WASHING SYSTEM

BACKGROUND OF THE INVENTION

1. Field of the Invention

The present invention relates to Pet Washing Devices and more particularly pertains to a new Ergonomic Hand Pet Washing System for facilitating washing of an animal without the user being in personal contact with the harsh shampoos utilized or the animal.

2. Description of the Prior Art

The use of Pet Washing Devices is known in the prior art. More specifically, Pet Washing Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Pet Washing Devices include U.S. Pat. No. 3,813,721; U.S. Pat. No. 5,158,208; U.S. Design Pat. No. 268,968; U.S. Pat. No. 5,336,012; U.S. Design Pat. No. 349,373 and U.S. Design Pat. No. 331,840.

While these devices fulfill their respective, particular objectives and requirements, the aforementioned patents do not disclose a new Ergonomic Hand Pet Washing System. The inventive device includes at least one resilient rubber glove formed to fit various sizes of hands, a rubber tubing secured to the resilient rubber glove carrying soap and water for washing, a valve secured at the end of the rubber tubing opposite of the resilient rubber glove which controls the soap and water flow, and an in-line shampoo applicator for adding soap to the water which enters the rubber tubing.

In these respects, the Ergonomic Hand Pet Washing System according to the present invention substantially departs from the conventional concepts and designs of the prior art, and in so doing provides an apparatus primarily developed for the purpose of facilitating washing of an animal without the user being in personal contact with the harsh shampoos utilized or the animal.

SUMMARY OF THE INVENTION

In view of the foregoing disadvantages inherent in the known types of Pet Washing Devices now present in the prior art, the present invention provides a new Ergonomic Hand Pet Washing System construction wherein the same can be utilized for facilitating washing of an animal without the user being in personal contact with the harsh shampoos utilized or the animal.

The general purpose of the present invention, which will be described subsequently in greater detail, is to provide a new Ergonomic Hand Pet Washing System apparatus and method which has many of the advantages of the Pet Washing Devices mentioned heretofore and many novel features that result in a new Ergonomic Hand Pet Washing System which is not anticipated, rendered obvious, suggested, or even implied by any of the prior art Pet Washing Devices, either alone or in any combination thereof.

To attain this, the present invention generally comprises at least one resilient rubber glove formed to fit various sizes of hands, a rubber tubing secured to the resilient rubber glove carrying soap and water for washing, a valve secured at the end of the rubber tubing opposite of the resilient rubber glove which controls the soap and water flow, and an in-line shampoo applicator for adding soap to the water which enters the rubber tubing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Ergonomic Hand Pet Washing System apparatus and method which has many of the advantages of the Pet Washing Devices mentioned heretofore and many novel features that result in a new Ergonomic Hand Pet Washing System which is not anticipated, rendered obvious, suggested, or even implied by any of the prior art Pet Washing Devices, either alone or in any combination thereof.

It is another object of the present invention to provide a new Ergonomic Hand Pet Washing System which may be easily and efficiently manufactured and marketed.

It is a further object of the present invention to provide a new Ergonomic Hand Pet Washing System which is of a durable and reliable construction.

An even further object of the present invention is to provide a new Ergonomic Hand Pet Washing System which is susceptible of a low cost of manufacture with regard to both materials and labor, and which accordingly is then susceptible of low prices of sale to the consuming public, thereby making such Ergonomic Hand Pet Washing System economically available to the buying public.

Still yet another object of the present invention is to provide a new Ergonomic Hand Pet Washing System which provides in the apparatuses and methods of the prior art some of the advantages thereof, while simultaneously overcoming some of the disadvantages normally associated therewith.

Still another object of the present invention is to provide a new Ergonomic Hand Pet Washing System for facilitating washing of an animal without the user being in personal contact with the harsh shampoos utilized or the animal.

3

Yet another object of the present invention is to provide a new Ergonomic Hand Pet Washing System which includes at least one resilient rubber glove formed to fit various sizes of hands, a rubber tubing secured to the resilient rubber glove carrying soap and water for washing, a valve secured at the end of the rubber tubing opposite of the resilient rubber glove which controls the soap and water flow, and an in-line shampoo applicator for adding soap to the water which enters the rubber tubing.

Still yet another object of the present invention is to provide a new Ergonomic Hand Pet Washing System that provides an efficient washing for an animal without the user personally touching the harsh chemicals used.

Even still another object of the present invention is to provide a new Ergonomic Hand Pet Washing System that makes the animal feel like it is being petted instead of being washed thereby allowing the animal to stand steady.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
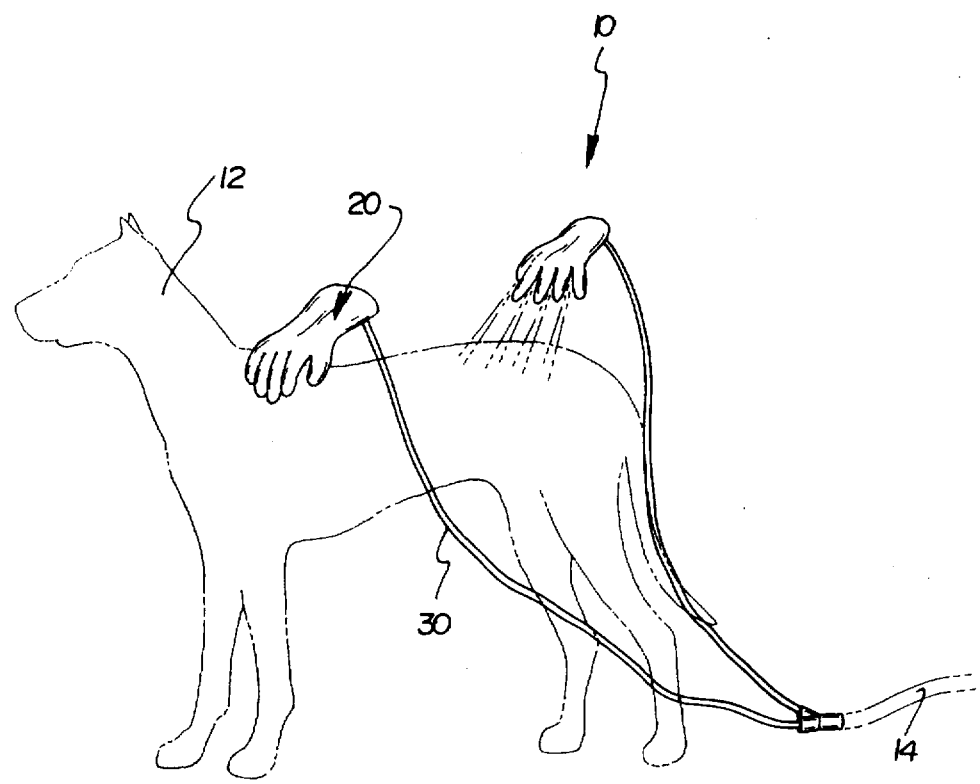
FIG. 1 is a side perspective view of a new Ergonomic Hand Pet Washing System according to the present invention.
Figure 2:
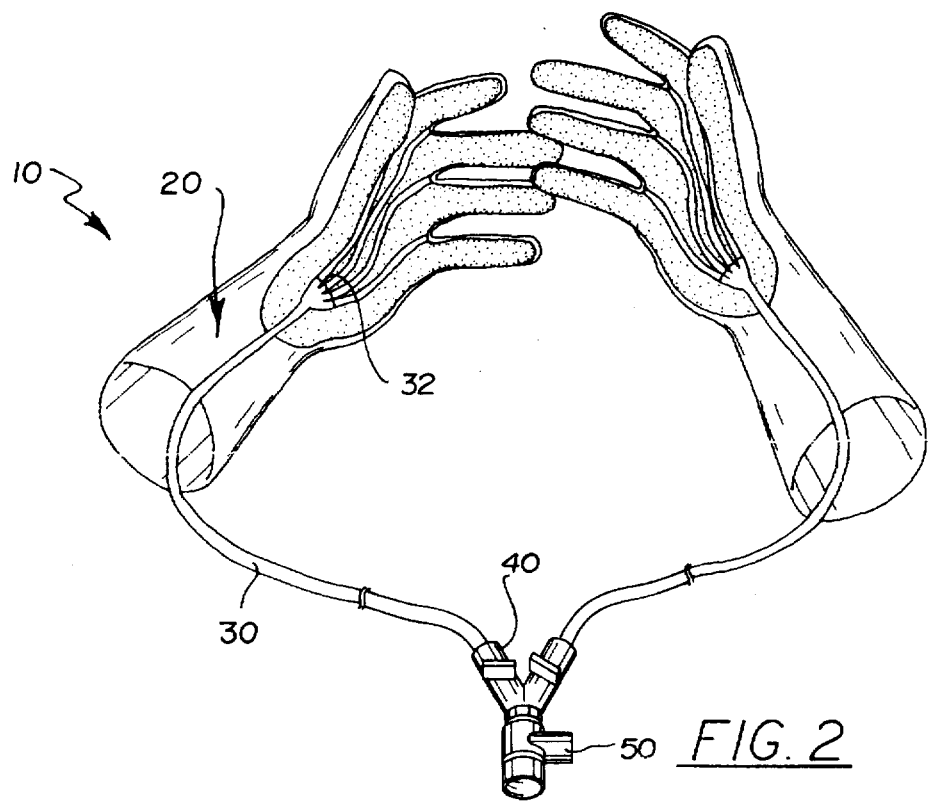
FIG. 2 is a perspective view of the palm portion of the present invention enclosing the plurality of outlet veins.

With reference now to the drawings, and in particular to FIGS. 1 through 6 thereof, a new Ergonomic Hand Pet Washing System embodying the principles and concepts of the present invention and generally designated by the reference numeral 10 will be described.

More specifically, it will be noted that the Ergonomic Hand Pet Washing System 10 comprises at least one resilient rubber glove 20 formed to fit various sizes of hands, a rubber tubing 30 secured to the interior portion of the resilient glove opposite of the fingers portion of the resilient rubber glove 20, and a valve 40 connected to the end of the rubber tubing 30 opposite of the resilient glove.

4

Figure 3:
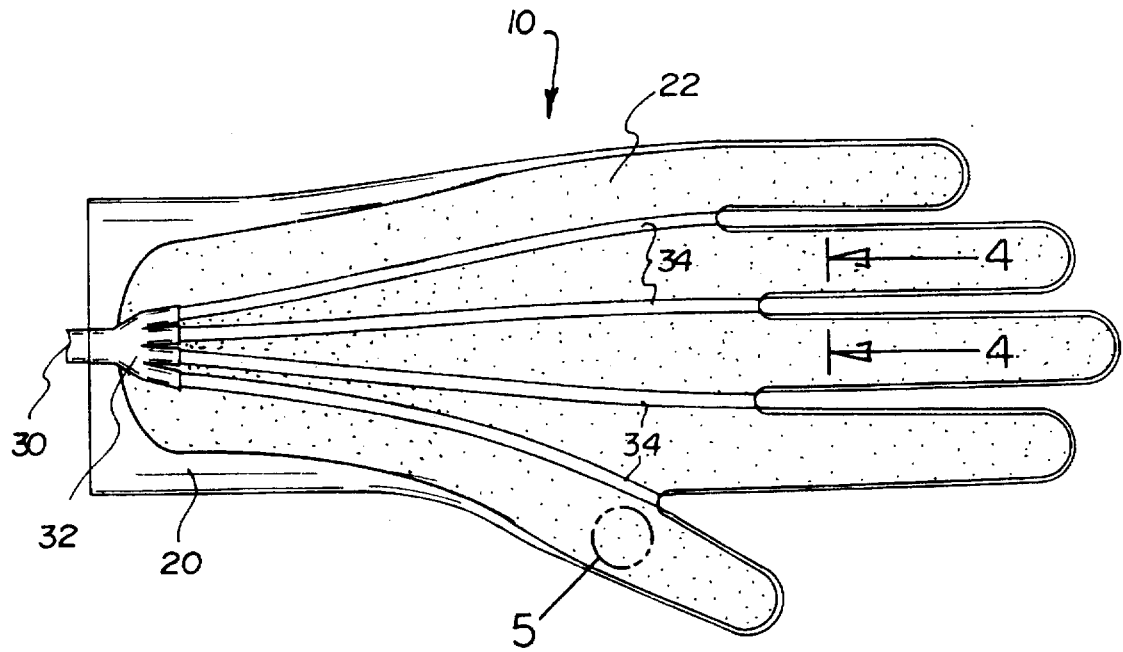
FIG. 3 is a magnified view of the palm portion of the present invention further disclosing the outlet veins projecting into the outlet ports mesial the finger portions of the resilient rubber glove.
Figure 4:
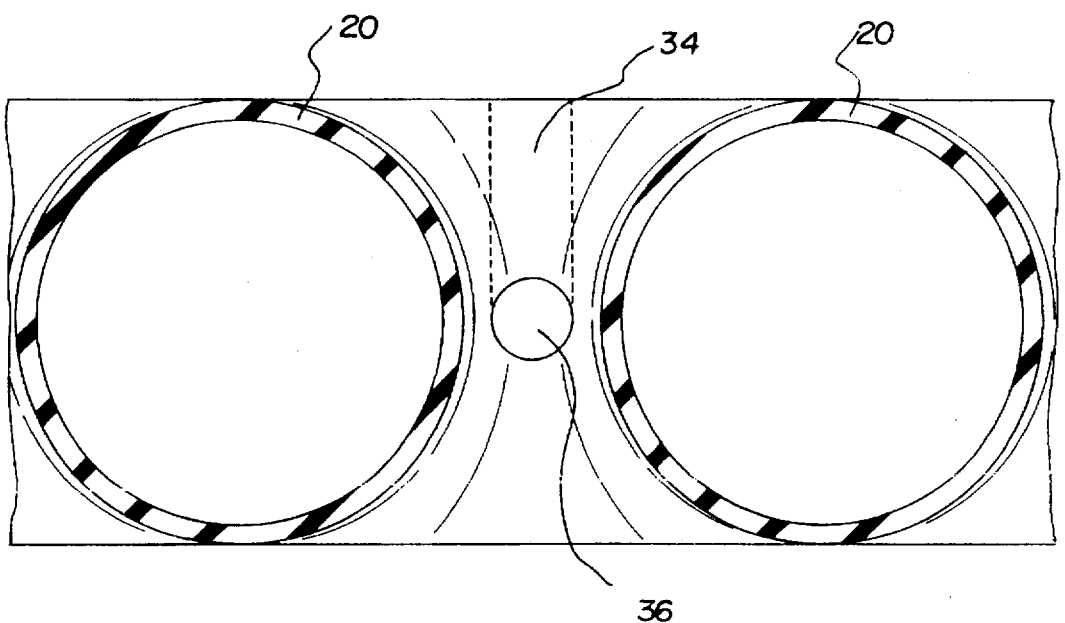
FIG. 4 is a cross sectional view taken along line 4—4 of FIG. 3 disclosing the outlet port mesial the finger portions of the resilient rubber glove.
Figure 5:
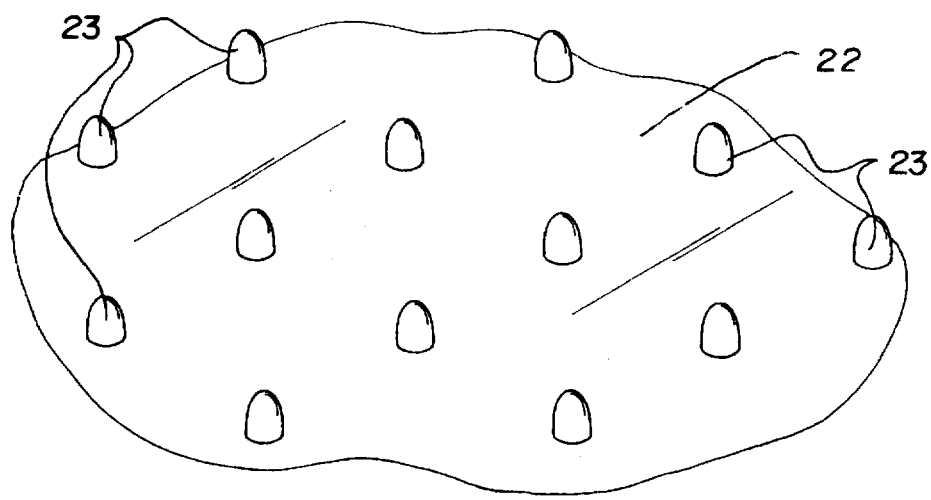
FIG. 5 is a magnified view of the palm agitating rubber layer.
Figure 6:
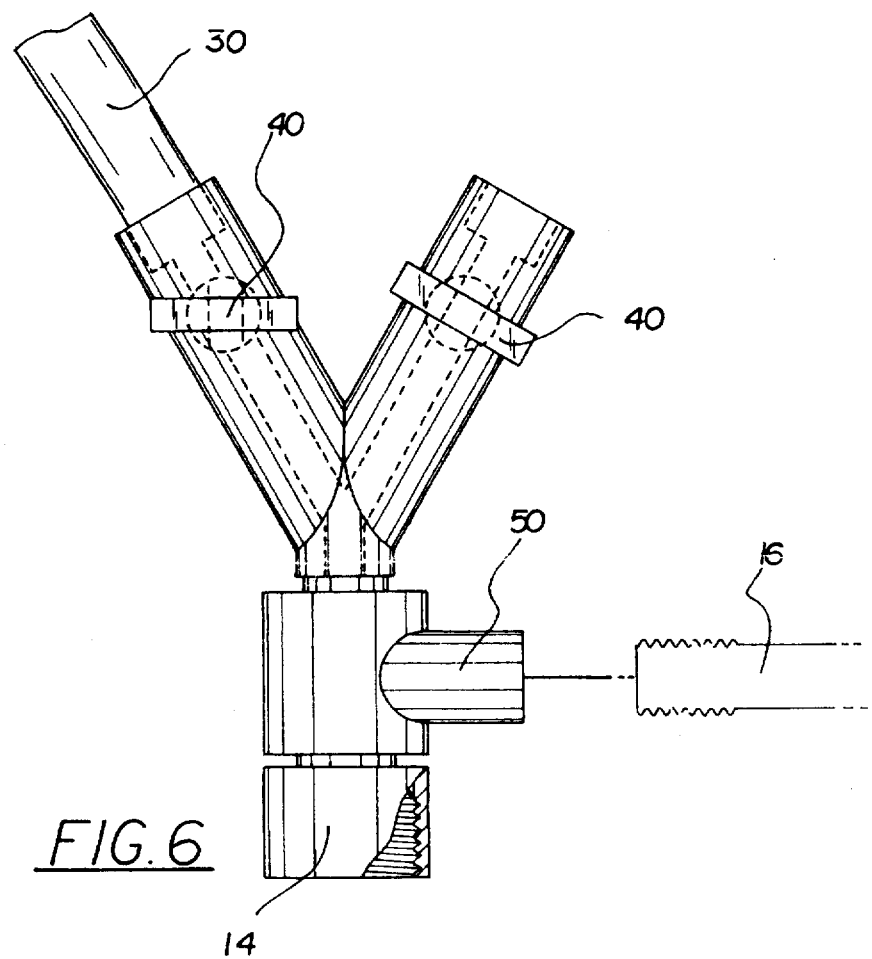
FIG. 6 is a magnified view of the valve connected to the in-line shampoo applicator.

As best illustrated in FIGS. 5, it can be shown that the resilient rubber glove 20 includes a palm agitating rubber layer 22 which comprises a plurality of mammilated rubber tips 23 secured orthogonally to the exterior surface of the palm agitating rubber layer 22 which agitate the soap and water during washing of an animal 12. The rubber tubing 30 includes a quadsplitting outlet port 32 fluidly connected to the rubber tubing 30 opposite of the valve 40 and positioned mesial the resilient rubber glove 20 and the palm agitating rubber layer 22 as best shown in FIG. 3 of the drawings. At least four outlet veins 34 are fluidly connected to the quad-splitting outlet port 32 opposite of the rubber tubing 30. The outlet veins 34 project substantially parallel to one another angling slightly so each outlet vein terminates into an outlet port 36 mesial two finger members of the resilient rubber glove 20 as best disclosed in FIG. 4 of the drawings. An in-line shampoo applicator 50 is fluidly connected to the valve 40 opposite of the rubber tubing 30. The inline shampoo applicator 50 couples with a soap connector 16 orthogonal to the valve 40 and couples to a hose 14 on the end opposite of the valve 40 as best disclosed in FIG. 6 of the drawings.

In an alternative embodiment of the present invention, the rubber tubing 30 is fluidly connected to an unnumbered interior reservoir formed mesial the palm agitating rubber layer 22 and the resilient rubber glove 20. The palm agitating rubber layer 22 includes a plurality of apertures fluidly connected to said unnumbered interior reservoir allowing the soap and water to radiate uniformly throughout the palm agitating rubber layer 22.

In use, the user connects the hose 14 to the in-line shampoo applicator 50 and connects the soap connector 16 to the in-line shampoo applicator 50. The user then controls the flow of soap and water by the valve 40. The user inserts his hand into the resilient rubber glove 20 and begins to agitate the present invention between the animal's fur. The soap and water flow through the valve 40 into the rubber tubing 30 splitting at the quadsplitting outlet port 32, where the soap and water is dispensed onto the animal 12 through the outlet ports 36 mesial the fingers of the resilient rubber glove 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ergonomic hand pet washing system comprising:
   at least one glove;
   a tube secured to a palm portion of the glove;

wherein the glove includes a palm agitating layer which comprises a plurality of mammilated rubber tips secured orthogonally to an exterior surface of the palm agitating layer for agitating soap and water during washing of an animal;

wherein the tube is fluidly connected to an interior reservoir formed between the palm agitating layer and the palm portion of the glove; and wherein the palm agitating layer includes a plurality of apertures fluidly connected to said interior reservoir for allowing water to penetrate substantially uniformly through the palm agitating layer.

2. An ergonomic hand pet washing system comprising at least one resilient rubber glove formed to fit various sizes of hands;

a rubber tubing secured to an interior portion of the resilient glove opposite of the finger portions of the resilient rubber glove; and a valve connected to an end of the rubber tubing opposite of the resilient glove;

wherein the resilient rubber glove includes a palm agitating rubber layer which comprises a plurality of mammilated rubber tips secured orthogonally to an exterior surface of the palm agitating rubber layer which agitate soap and water during washing of an animal;

wherein the rubber tubing includes:
- a quad-splitting outlet port fluidly connected to the rubber tubing opposite of the valve and positioned between the resilient rubber glove and the palm agitating rubber layer;
- at least four outlet veins fluidly connected to the quad-splitting outlet port opposite of the rubber tubing, where the outlet veins project substantially parallel to one another angling slightly so each outlet vein terminate into an outlet port between two finger members of the resilient rubber glove.

3. The ergonomic hand pet washing system of claim 2 wherein an in-line shampoo applicator is fluidly connected to the valve opposite of the rubber tubing, where the in-line shampoo applicator couples with a soap connector orthogonal to the valve and couples to a hose on the end opposite of the valve.

4. The ergonomic hand pet washing system of claim 2 wherein the rubber tubing is fluidly connected to an interior reservoir formed between the palm agitating rubber layer and the resilient rubber glove.

5. An ergonomic hand pet washing system comprising at least one resilient rubber glove formed to fit various sizes of hands;

a rubber tubing secured to an interior portion of the resilient glove opposite of the finger portions of the resilient rubber glove; and a valve connected to an end of the rubber tubing opposite of the resilient glove;

wherein the resilient rubber glove includes a palm agitating rubber layer which comprises a plurality of mammilated rubber tips secured orthogonally to an exterior surface of the palm agitating rubber layer which agitate soap and water during washing of an animal;

wherein the rubber tubing is fluidly connected to an interior reservoir formed between the palm agitating rubber layer and the resilient rubber glove;

wherein the palm agitating rubber layer includes a plurality of apertures fluidly connected to said interior reservoir allowing the soap and water to radiate uniformly throughout the palm agitating rubber layer.

* * * * *